United States Patent
Bakeman, Jr.

(10) Patent No.: US 6,332,584 B1
(45) Date of Patent: Dec. 25, 2001

(54) MAGNETIC TAPE SPLICING FOR REDUCING TAPE PACK DISTORTION

(75) Inventor: Jack S. Bakeman, Jr., Boulder, CO (US)

(73) Assignee: Exabyte Corporation, Boulder, CO (US)

( * ) Notice: Subject to any disclaimer, the term of this patent is extended or adjusted under 35 U.S.C. 154(b) by 0 days.

(21) Appl. No.: 09/617,506

(22) Filed: Jul. 14, 2000

(51) Int. Cl.$^7$ ..................................... G03B 23/02
(52) U.S. Cl. ........................ 242/348; 242/332.4
(58) Field of Search ................ 242/341, 348.2, 242/348.3, 348, 532.3, 556, 556.1; 360/132, 134

(56) References Cited

U.S. PATENT DOCUMENTS

| | | | |
|---|---|---|---|
| 4,110,142 | * | 8/1978 | Tall . |
| 4,180,181 | | 12/1979 | Brandwein . |
| 4,325,087 | * | 4/1982 | Moris ................................ 360/134 X |
| 5,332,173 | * | 7/1994 | Kubota et al. ..................... 242/348.3 |
| 5,348,793 | * | 9/1994 | Stettner .......................... 242/556.1 X |
| 5,692,699 | | 12/1997 | Weirauch et al. . |
| 5,845,860 | * | 12/1998 | Tohjo et al. ......................... 242/348 |
| 5,996,927 | | 12/1999 | Weirauch et al. . |
| 6,135,379 | * | 10/2000 | Argumedo .......................... 360/132 |

FOREIGN PATENT DOCUMENTS

406064796-A * 3/1994 (JP) .................... 242/556.1

* cited by examiner

Primary Examiner—William A. Rivera
(74) Attorney, Agent, or Firm—Nixon & Vanderhye, P.C.

(57) ABSTRACT

A pack of magnetic recording tape (200) comprises a splicing tape (220) which adheres a web of a magnetic tape (222) to a leader (224). The leader (224) attaches to a reel hub (226) around which the tape is to be wound. At least an intermediate portion of the splicing tape (220) has its ends oriented non-othogonally to the elongated dimension (227) of the magnetic recording tape. Preferably, the ends of the splicing tape are oriented to be substantially parallel to a helical scan data track (238) to be transduced (e.g., recorded or reproduced) on magnetic tape. In one embodiment, the ends ($220_E$-8) of the splicing tape (220-8) have essentially the shape of the letter "Z". By providing splices that replicate a path that a transducing head (e.g., scanner head) will travel over the magnetic tape, very few data tracks are sacrificed due to the deformations or print-through. The tape pack (200) of the present invention can be utilized in a magnetic tape cassette or cartridge (240), which can be either a dual reel cartridge or a single reel cartridge.

10 Claims, 3 Drawing Sheets

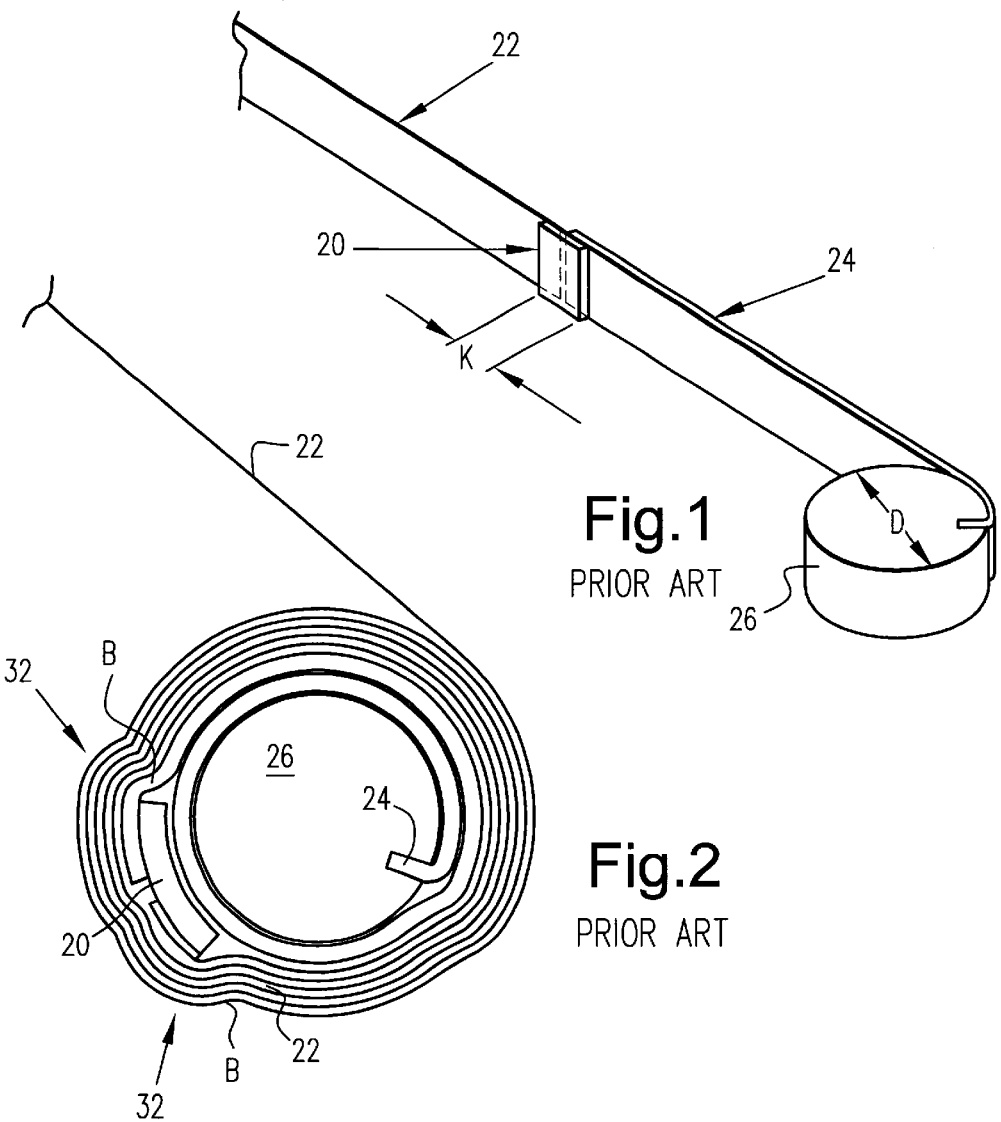
Fig. 1
PRIOR ART
Fig. 2
PRIOR ART
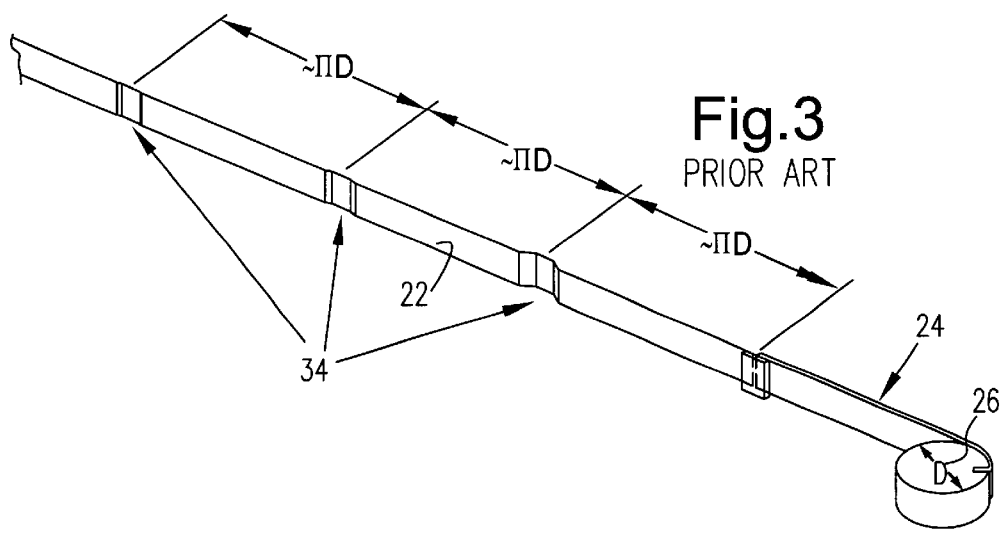
Fig. 3
PRIOR ART

MAGNETIC TAPE SPLICING FOR REDUCING TAPE PACK DISTORTION

This application is related to simultaneously-filed U.S. patent application Ser. No. 09/617,000, entitled "MAGNETIC TAPE SPLICING FOR REDUCING TAPE PACK DISTORTION" which is incorporated herein by reference.

BACKGROUND

1. Field of the Invention

The present invention pertains to magnetic tape of the type employed for transducing information, and particularly to such magnetic tape having a leader for securing the magnetic tape to a reel hub.

2. Related Art and Other Considerations

Manufacturers of magnetic tape cartridges (also known as magnetic tape cassettes) have historically and traditionally constructed the tape portion of the cartridge in the manner illustrated in FIG. 1. In particular, a small piece of adhesive-coated tape 20 (sometimes referred to as a "splicing tape" or "splice tape"has been used in a lap joint configuration to join magnetic tape 22 to a leader 24. The leader 24 attaches to a reel hub 26 around which the tape is to be wound.

Unfortunately, the presence of the splicing tape creates "bumps" B or "print-throughs" in the tape pack as shown in FIG. 2. As additional tape layers are wound on hub 26, the inward pressure increases on the inner layers, and the stress in the magnetic tape 22 at the discontinuities attributable to the splicing tape-created bumps B at the angular positions indicated by arrows 32. The stress may be high enough to create permanent deformations in the magnetic recording tape. These deformations appear as two vertical folds in the magnetic tape. The deformations remain (and can even become permanent) after the magnetic tape has been unwound from the reel hub, as illustrated by deformations 34 in FIG. 3. The permanent deformations are greatest in the first outer tape layer adjacent to the splicing tape, and can persist for many layers.

The deformations occasioned by the prior art splicing tape create undesired signal losses when a transducing head attempts to record or reproduce information with respect to the magnetic tape. The signal losses are attributable, at least in part, to the increased head-to-tape spacing with both helical and longitudinal recording methods. Areas of the magnetic tape having the permanent deformations may be rendered unusable.

FIG. 4 shows the usual prior art situation in which the splicing tape 20 is vertically oriented, e.g., has splicing tape ends $20_E$ which are perpendicular to the elongated edges 36 of the magnetic recording tape 22. In this prior art vertical orientation, for helical scan recording the deformations occasioned by the splicing tape cut across many data tracks or stripes. The helical data tracks are inclined at an angle with respect to the splicing tape ends $20_E$, as exemplified by track 38 in FIG. 4, due to the fact, e.g., that a transducing head on a recording scanner or drum travels across the tape at a shallow angle. When the deformations or print-throughs are vertically oriented in the manner depicted by FIG. 4, they can affect (e.g., render unusable) many data tracks.

What is needed, therefore, and an object of the present invention, is a way to minimize or counteract the deformations occasioned by a splicing tape which joins magnetic recording tape to a leader or trailer.

BRIEF SUMMARY OF THE INVENTION

A pack of magnetic recording tape comprises a splicing tape which adheres a web of magnetic tape to a leader. The leader attaches to a reel hub around which the tape is to be wound. At least an intermediate portion of the splicing tape has its ends oriented non-othogonally to the elongated dimension of the magnetic recording tape. Preferably, the ends of the splicing tape are oriented to be substantially parallel to a helical scan data track to be transduced (e.g., recorded or reproduced) on magnetic tape. In one embodiment, the ends of the splicing tape have essentially the shape of the letter "Z". By providing splices that replicate a path that a transducing head (e.g., scanner head) will travel over magnetic tape, very few data tracks are sacrificed due to the deformations or print-through.

The tape pack of the present invention can be utilized in a magnetic tape cassette or cartridge. The cassette or cartridge can be of a type which has both a supply reel hub and a take-up reel hub, and between which the magnetic tape extends. The splicing tape of the present invention can be utilized to secure the magnetic tape to a leader at the supply reel hub, or to a leader at the take-up reel hub, or both. Alternatively, the cassette or cartridge with which the tape pack of the present invention is operable can be a single reel cartridge.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1 is a perspective view of a portion of a prior art tape pack.

FIG. 2 is a top view of the prior art tape pack of FIG. 1 in a wound configuration.

FIG. 3 is a perspective view of the prior art tape pack of FIG. 1 in an unwound configuration showing deformations occasioned by a prior art splicing tape.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices and methods are omitted so as not to obscure the description of the present invention with unnecessary detail.

Figure 5:
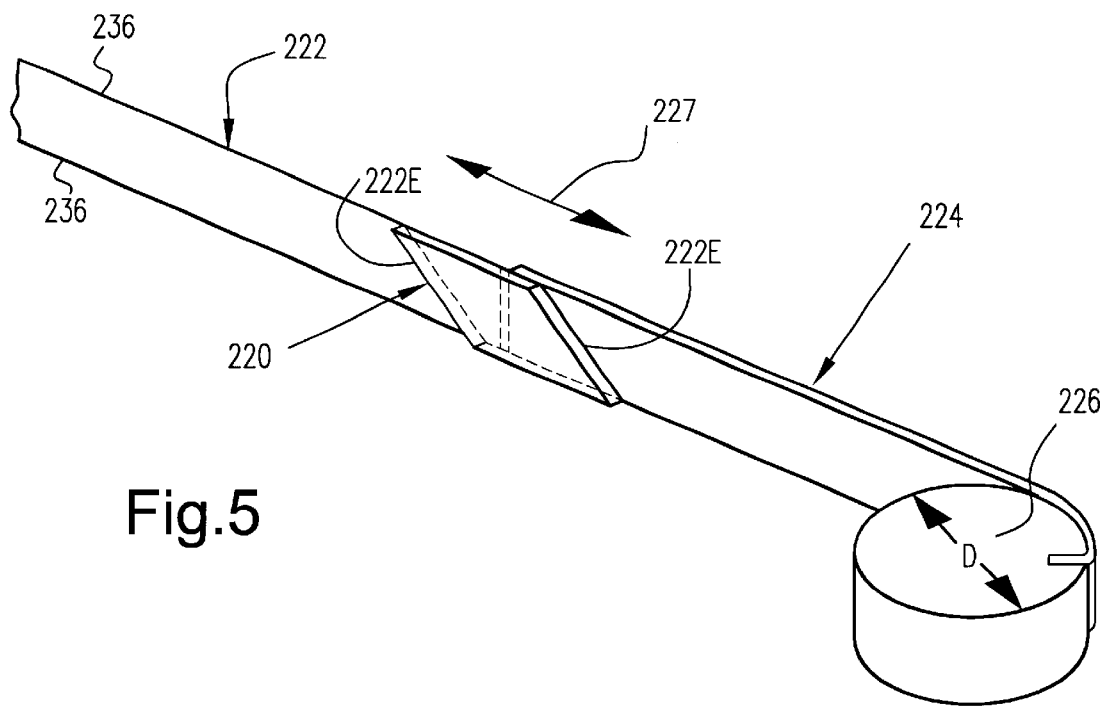
FIG. 5 is a perspective view of a portion of a tape pack according to an embodiment of the present invention.

FIG. 5 shows a portion of a tape pack 200 according to an embodiment of the present invention. In tape pack 200, a splicing tape 220 adheres a web of magnetic tape 222 to a leader 224. In conventional fashion, leader 224 attaches to a reel hub 226 around which the tape is to be wound. The magnetic tape 222, and thus tape pack 200 generally, extends in an elongated dimension indicated by arrow 227. The magnetic tape 222 has edges 236 which are parallel to the elongated dimension of arrow 227.

In terms of the present invention, the term "leader" includes a web which, via the connection of splicing tape 220, secures the magnetic tape 222 to either of a supply reel hub or a take-up reel hub, e.g., of a cartridge or cassette. Thus, the term "leader" is employed generically with respect to attachment to any particular hub, and to encompass a "trailer".

Figure 4:
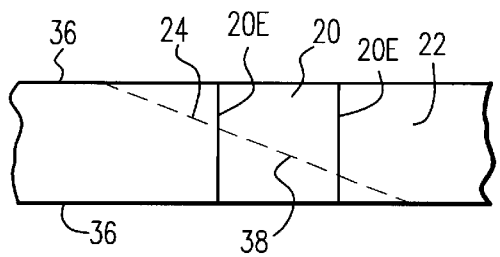
FIG. 4 is a plan view of the prior art tape pack of FIG. 1, showing orientation of ends of the prior art splicing tape.
Figure 6:
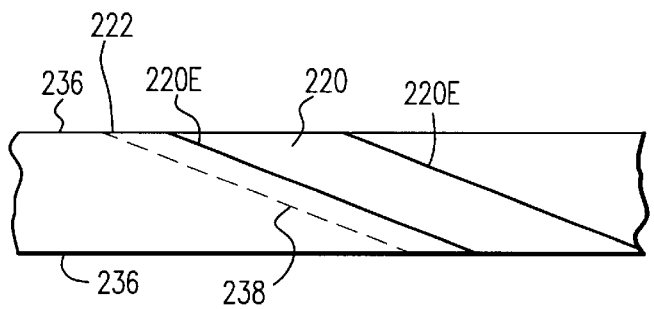
FIG. 6 is a plan view of the tape pack of FIG. 5, showing orientation of ends of an example splicing tape according to the present invention.

In contrast to the prior art, and as shown for example in FIG. 5 and in more detail in FIG. 6, the ends $220_E$ of splicing tape 220 (and hence splicing tape 220 generally) are non-orthogonal to the elongated edges 236 of magnetic tape 222. Preferably, the ends $220_E$ of splicing tape 220 are oriented to be substantially parallel to a helical scan data track to be transduced (e.g., recorded or reproduced) on magnetic tape 222. FIG. 6 shows an example helical scan data track 238 recorded on magnetic tape 222, with the ends $22_E$ of splicing tape 220 being parallel to helical scan data track 238.

Figure 7:
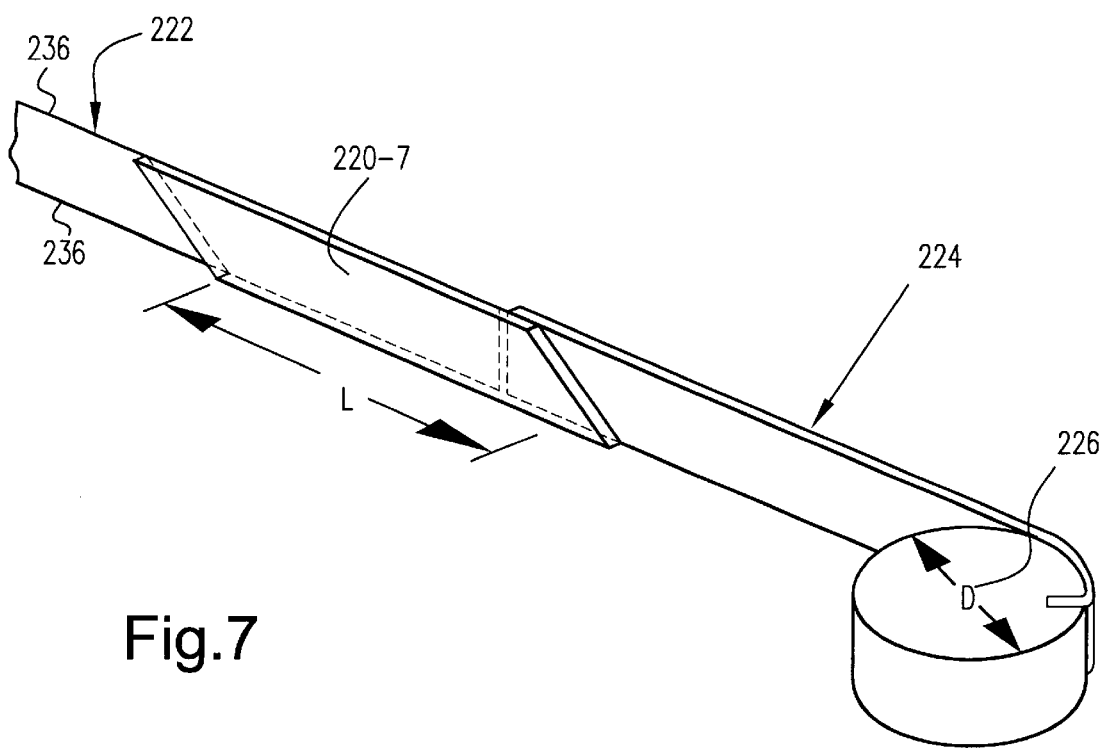
FIG. 7 is a plan view of a portion of a tape pack according to another embodiment of the present invention.

FIG. 7 shows an embodiment in which a length L of splicing tape 220-7 (in a direction parallel to the elongate dimension 227 of magnetic tape 222) is longer than a conventional splicing tape. In particular, in the FIG. 7 embodiment, the length L of the splicing tape 220-7 is on the order of NπD, where D is the diameter of reel hub 226 and N is an integer. Aspects of the embodiment of FIG. 7 are understood, e.g., with reference to simultaneously-filed U.S. patent application Ser. No. 09/617,000, entitled "MAGNETIC TAPE SPLICING FOR REDUCING TAPE PACK DISTORTION" which is incorporated herein by reference.

Figure 8:
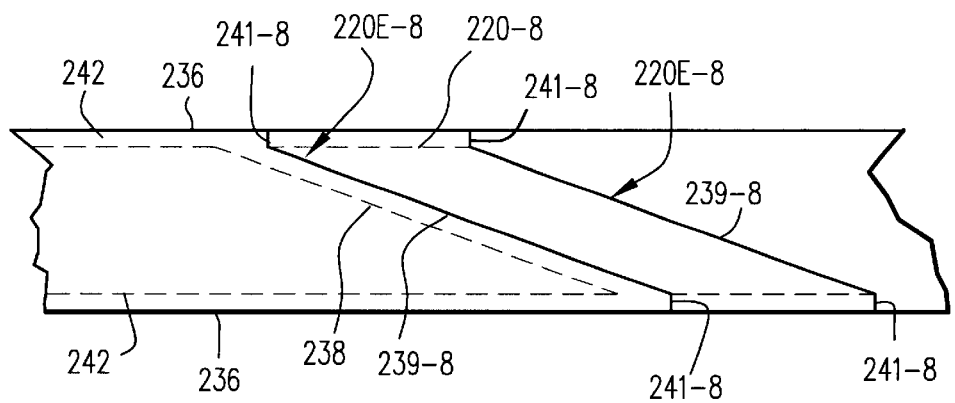
FIG. 8 is a perspective view of a portion of a tape pack according to yet another embodiment of the present invention.

FIG. 8 shows another embodiment in which ends $220_E$-8 of splicing tape 220-8 have essentially the shape of the letter "Z". In other words, ends $220_E$-8 have an intermediate segment 239-8 which is non-orthogonal to the elongated edges 236 in the manner above discussed, e.g., with reference to FIG. 5 and FIG. 6. In addition, ends $220_E$-8 of splicing tape 220-8 have at least one edge segment 241-8 which is orthogonal to the elongated edges 236 in an edge region 242. The edge region 242 of splicing tape 220-8 corresponds to an edge region of the magnetic tape 222 in which data is not recorded.

By providing splices that replicate a path that a transducing head (e.g., scanner head) will travel over magnetic tape 222, very few data tracks are sacrificed due to the deformations or print-through. The data tracks that are rendered unusable in accordance with the present invention are believed to be an order of magnitude less than the prior art.

Figure 9:
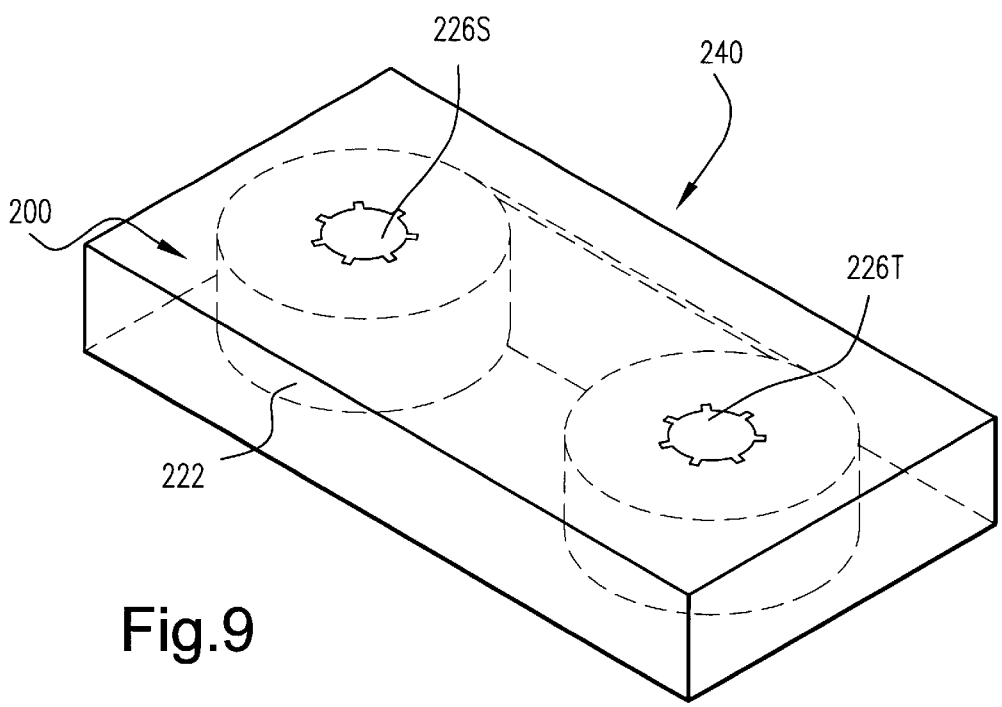
FIG. 9 is a perspective view of a magnetic tape cassette or cartridge which contains the tape pack of the present invention.

FIG. 9 shows an example magnetic tape cassette or cartridge 240 in which the tape pack 200 can be included. The cassette or cartridge 240 has both a supply reel hub 226S and a take-up reel hub 226T, between which the magnetic tape 222 extends. The supply reel hub 226S and take-up reel hub 226T are rotatably mounted within cassette or cartridge 240. The splicing tape 220 of the present invention can be utilized to secure the magnetic tape 222 to a leader 224S at the supply reel hub 226S, or to a leader 224T at the take-up reel hub 226T, or both. The cassette or cartridge 240 with which the tape pack 200 of the present invention is operable can be any conventional two-reel cartridge, including any of those subject to various existing standards and commercially marketed products. For sake of simplicity, various features of such cassettes or cartridges are not illustrated in FIG. 9, such as exterior and interior features including such aspects as cartridge lids, notches, and various windows and/or sensing apertures.

The cassette or cartridge 240 with which the tape pack 200 of the present invention is usable need not be a dual reel hub cartridge, but instead can be a single reel hub cartridge such as those conventionally available. For example, such a single reel cartridge would have a machine or otherwise engageable leader provided at the end of its tape pack which is not attached to a reel hub.

The magnetic tape 222 need not be any specific size or dimension of tape, but can be employed with any such tape of which 8 mm magnetic recording tape is but one example. Nor is the ultimate use of the magnetic tape necessarily germane to the present invention, as the tape can be utilized for recording/reproducing various types of information, such as computer data (e.g., computer back-up) and/or audio or video.

The term "leader" as employed herein can refer to any web which is employed for securing a magnetic tape to a reel hub. Thus, it makes no difference for the present invention whether the leader is positioned before the beginning of the magnetic tape (e.g., upstream with respect to the physically earliest recording positions) or after the end of the magnetic tape. While the leader may be formed of transparent material, the composition and properties of the leader are not significant for the purposes of the present invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A pack of magnetic recording tape comprising:

a reel hub;

a leader tape secured to the reel hub;

a web of magnetic recording tape having an elongated dimension;

a splicing tape which secures the web to the leader, wherein at least a portion of the splicing tape is oriented non-orthogonally to the elongated dimension of the web and substantially parallel to a helical scan data track to be transduced on the magnetic tape.

2. The pack of claim 1, wherein at least a portion of the splicing tape has at least one of its ends oriented non-orthogonally to the elongated dimension of the web.

3. The pack of claim 1, wherein at least a portion of the splicing tape has at least one of its ends oriented substantially parallel to a helical scan data track to be transduced on the magnetic tape.

4. The pack of claim 1, wherein at least an intermediate segment of the splicing tape is oriented substantially parallel to a helical scan data track to be transduced on the magnetic tape, and wherein an edge segment of the splicing tape is oriented orthogonally to the elongated dimension of the web in a zone of the web in which data is not transduced.

5. The pack of claim 4, wherein an end of the splicing tape essentially has a "Z" shape.

6. A cassette of magnetic recording tape comprising:

a cassette housing;

a reel hub rotatably mounted in the cassette housing;

a leader tape secured to the reel hub;

a web of magnetic recording tape having an elongated dimension;

a splicing tape which secures the web to the leader, wherein at least a portion of the splicing tape is oriented non-orthogonally to the elongated dimension of the web and substantially parallel to a helical scan data track to be transduced on the magnetic tape.

7. The cassette of claim 6, wherein at least a portion of the splicing tape has at least one of its ends oriented non-orthogonally to the elongated dimension of the web.

8. The cassette of claim 6, wherein at least a portion of the splicing tape has at least one of its ends oriented substantially parallel to a helical scan data track to be transduced on the magnetic tape.

9. The cassette of claim 6, wherein at least an intermediate segment of the splicing tape is oriented substantially parallel to a helical scan data track to be transduced on the magnetic tape, and wherein an edge segment of the splicing tape is oriented orthogonally to the elongated dimension of the web in a zone of the web in which data is not transduced.

10. The cassette of claim 6, wherein at least one end of the splicing tape essentially has a "Z" shape.

\* \* \* \* \*